United States Patent
Han et al.

(10) Patent No.: US 10,085,046 B2
(45) Date of Patent: Sep. 25, 2018

(54) VIDEO TRANSMISSION METHOD, GATEWAY DEVICE, AND VIDEO TRANSMISSION SYSTEM

(71) Applicant: Huawei Technologies Co., Ltd., Shenzhen (CN)

(72) Inventors: Tingjun Han, Shenzhen (CN); Guiqing Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/456,137

(22) Filed: Mar. 10, 2017

(65) Prior Publication Data

US 2017/0188055 A1    Jun. 29, 2017

Related U.S. Application Data

(63) Continuation of application No. PCT/CN2015/080034, filed on May 28, 2015.

(30) Foreign Application Priority Data

Sep. 11, 2014    (CN) .......................... 2014 1 0461427

(51) Int. Cl.
*H04N 21/231*    (2011.01)
*H04N 21/845*    (2011.01)
(Continued)

(52) U.S. Cl.
CPC ..... *H04N 21/231* (2013.01); *H04N 21/23106* (2013.01); *H04N 21/643* (2013.01);
(Continued)

(58) Field of Classification Search
CPC ......... H04N 21/8456; H04N 21/23106; H04N 21/643; H04N 21/8586; H04N 21/231;
(Continued)

(56) References Cited

U.S. PATENT DOCUMENTS

| | | |
|---|---|---|
| 8,935,363 B2 | 1/2015 | Zang et al. |
| 2009/0043906 A1 | 2/2009 | Hurst et al. |

(Continued)

FOREIGN PATENT DOCUMENTS

| | | |
|---|---|---|
| CN | 102714602 A | 10/2012 |
| CN | 102868909 A | 1/2013 |

(Continued)

*Primary Examiner* — Nathan Flynn
*Assistant Examiner* — Cynthia Fogg
(74) *Attorney, Agent, or Firm* — Leydig, Voit & Mayer, Ltd.

(57) ABSTRACT

A video transmission method is disclosed herein. A target video segmentation is transmitted to a piece of user equipment relatively quickly, so that caching efficiency of a caching device can be improved, and a processing burden of the caching device can be reduced. The method includes: receiving, by a gateway device, a target URL sent by a second user equipment, and determining, from a caching device, a second video corresponding to the target URL; determining a segmentation part of the target URL according to the segmentation part extraction model; and determining a target video segmentation from the second video according to the segmentation part of the target URL, and sending the target video segmentation to the second user equipment.

16 Claims, 3 Drawing Sheets

(51) Int. Cl.
  *H04N 21/8352* (2011.01)
  *H04N 21/858* (2011.01)
  *H04N 21/643* (2011.01)

(52) U.S. Cl.
  CPC ..... *H04N 21/8352* (2013.01); *H04N 21/8456* (2013.01); *H04N 21/8586* (2013.01)

(58) Field of Classification Search
  CPC .......... H04N 21/8352; H04N 21/4385; H04N 21/44004; H04N 21/2183; H04N 21/23406; H04N 21/4325; H04N 21/4331
  USPC ....................................................... 725/115
  See application file for complete search history.

(56) References Cited

U.S. PATENT DOCUMENTS

| | | |
|---|---|---|
| 2012/0030212 A1 | 2/2012 | Koopmans et al. |
| 2012/0191804 A1 | 7/2012 | Wright et al. |
| 2012/0310941 A1* | 12/2012 | MacDonald ........ G06F 17/3089 707/740 |
| 2013/0103689 A1 | 4/2013 | Choi et al. |
| 2014/0137168 A1* | 5/2014 | Takahashi .......... H04N 21/6125 725/90 |
| 2014/0201335 A1* | 7/2014 | Wang .................. H04L 65/4092 709/219 |
| 2014/0281707 A1* | 9/2014 | Su ....................... H04L 67/2842 714/18 |

FOREIGN PATENT DOCUMENTS

| | | |
|---|---|---|
| CN | 104301743 A | 1/2015 |
| WO | 2013148003 A1 | 10/2013 |

* cited by examiner

| | |
|---|---|
| Host part | http://v18.lscache7.c.youtube.com/ |
| Path part | videoplayback? |
| Quey Param part | 4&ipbits=0&range=178176 03563519&signature=.BC606865625583C2BE5AA6472A7536D827ED7E58&sver=3&expire=125210520 0&key=yt1&factor=1.25&burst=40&id=c19764decede17ab |

Path part http: //proxy-39.dailymotion.com/sec(44ab57eec5d981faa33)/frag(0) /video/484/516/56615484_mp4_h264_aac_1.flv

VIDEO TRANSMISSION METHOD, GATEWAY DEVICE, AND VIDEO TRANSMISSION SYSTEM

CROSS-REFERENCE TO RELATED APPLICATIONS

This application is a continuation of International Application No. PCT/CN2015/080034, filed on May 28, 2015, which claims priority to Chinese Patent Application No. 201410461427.1, filed on Sep. 11, 2014. The disclosures of the aforementioned applications are hereby incorporated by reference in their entireties.

TECHNICAL FIELD

The present disclosure relates to the field of communications, and in particular, to a video transmission method, a gateway device, and a video transmission system.

BACKGROUND

Currently, with the rapid development of the Internet, video services based on the open Internet are also rapidly popularized. Generally, an Internet video publisher provides a video play service to a terminal user by using a network provided by a telecommunications operator, where the telecommunications operator is only responsible for transmitting a video, and does not set foot in control, distribution, a copyright, and the like of video content.

In the prior art, video transmission is performed based on the Hypertext Transfer Protocol (HTTP). Specifically, when expecting to watch a video provided by an Internet video publisher (for example, a video website), a user sends an HTTP message to a telecommunications operator (for example, a gateway device) by using a piece of user equipment, where the HTTP message carries a uniform resource locator (URL) corresponding to the video that the user expects to watch, and the telecommunications operator may forward the HTTP message to the Internet video publisher (for example, a video server of the video website), to obtain the video from the Internet video publisher and deliver the video to the user equipment.

To enhance user experience and shorten a waiting time for a user to watch a video, a telecommunications operator generally disposes a caching device, to cache a video acquired from an Internet video publisher, and establishes an entry of a mapping relationship between each acquired video and each URL, so that when an HTTP message carrying a URL the same as that of the cached video is received, the video may be acquired from the caching device and delivered to a piece of user equipment.

However, the entry of a mapping relationship is generated based on a complete URL, or, the caching device completes indexing each video based on a complete URL, and a manner of using a complete URL as a caching index is very inefficient because a special action of the Internet video publisher does not comply with any standard specification.

For example, generally a URL of a video is generated dynamically by an Internet video publisher. For example, when watching a video, a user may perform a dragging action, and each drag triggers a piece of user equipment to send a new HTTP message to a telecommunications operator, to acquire a video segmentation corresponding to the dragging action. These HTTP messages may carry different URLs that are allocated by the Internet video publisher, and these URLs actually all correspond to a same video, but correspond to different specific clips. Therefore, a case in which a same video is repeatedly cached for multiple times, multiple URLs of the same video are requested, and only some of the URLs can be hit in a cache may exist, which severely reduces caching efficiency of a caching device and increases a processing burden of the caching device.

SUMMARY

Embodiments of the present disclosure provide a video transmission method, a gateway device, and a video transmission system, so that a target video segmentation is transmitted to a piece of user equipment relatively quickly, caching efficiency of a caching device can be improved, and a processing burden of the caching device can be reduced.

According to a first aspect, a video transmission method is provided, where the method is applied to a gateway device, where one side of the gateway device is communicatively connected to one or more video servers, and the other side of the gateway device is also communicatively connected to one or more pieces of user equipment; the gateway device is communicatively connected to a caching device, or, a caching device is integrated in the gateway device; the one or more pieces of user equipment include a second user equipment; the one or more video servers include a target video server; and the method includes: receiving, by the gateway device, a target URL sent by the second user equipment, and determining, from the caching device, a second video corresponding to the target URL, where the second video is from the target video server; determining, by the gateway device, a segmentation part of the target URL according to a segmentation part extraction model, where the segmentation part extraction model is used to indicate a segmentation part of a uniform resource locator URL, and the segmentation part is used to indicate a range of a video segmentation in an original video; and determining, by the gateway device, a target video segmentation from the second video according to the segmentation part of the target URL, and sending the target video segmentation to the second user equipment.

With reference to the first aspect, in a first implementation manner of the first aspect, the method further includes: receiving, by the gateway device, a first sample URL and a second sample URL that are from a first user equipment, where the first sample URL and the second sample URL both correspond to a first video; and determining a first sample information set according to the first sample URL, and determining a second sample information set according to the second sample URL; comparing the first sample information set with the second sample information set according to the segmentation part extraction condition, to determine segmentation information meeting the segmentation part extraction condition; and determining the segmentation part extraction model according to the segmentation information.

With reference to the first aspect and the foregoing implementation manner of the first aspect, in a second implementation manner of the first aspect, the first sample URL includes a Path part and a Query Param part; the Query Param part of the first sample URL includes K Query Params; the first sample information set includes at least one of the following: first information and second information; the first information is used to indicate a depth and a Path value of the Path part of the first sample URL; the second information is used to indicate names and parameter values of the K Query Params in the first sample URL; the second sample URL includes a Path part and a Query Param part;

the Query Param part of the second sample URL includes M Query Params; the second sample information set includes at least one of the following: third information and fourth information; the third information is used to indicate a depth and a Path value of the Path part of the second sample URL; and the fourth information is used to indicate names and parameter values of the M Query Params in the second sample URL.

With reference to the first aspect and the foregoing implementation manners of the first aspect, in a third implementation manner of the first aspect, the segmentation part extraction condition includes at least one of the following: a first condition, a second condition, and a third condition, where the first condition is: a depth of a Path part indicated by the segmentation information is the same in the first sample information set and the second sample information set, and a Path value indicated by the segmentation information is different in the first sample information set and the second sample information set; the second condition is: a name of a Query Param indicated by the segmentation information belongs to both the first sample information set and the second sample information set, and a parameter value of a Query Param indicated by the segmentation information is different in the first sample information set and the second sample information set; and the third condition is: a name of a Query Param indicated by the segmentation information belongs to only one of the following: the first sample information set and the second sample information set.

With reference to the first aspect and the foregoing implementation manners of the first aspect, in a fourth implementation manner of the first aspect, the receiving, by the gateway device, a first sample URL and a second sample URL that are from a first user equipment includes: receiving, by the gateway device, the first sample URL in a first period of time, and receiving the second sample URL in a second period of time, where an interval between the first period of time and the second period of time is determined according to a length of the first video.

With reference to the first aspect and the foregoing implementation manners of the first aspect, in a fifth implementation manner of the first aspect, the determining, from the caching device, a second video corresponding to the target URL includes: determining an identifier part extraction model, where the identifier part extraction model is used to indicate a identifier part of a URL; determining, according to the identifier part extraction model, an identifier part of each caching URL of a cached video in the caching device, where each caching URL corresponds to the cached video; and traversing a non-Host part of the target URL, and if it is determined that the non-Host part of the target URL includes a character string of an identifier part of at least one of the caching URLs, determining that the cached video is the second video.

With reference to the first aspect and the foregoing implementation manners of the first aspect, in a sixth implementation manner of the first aspect, the identifier part extraction model is determined according to identifier parts of at least two third sample URLs, the third sample URLs all correspond to a third video, the third sample URLs have different character strings, identifier parts of the third sample URLs have a same character string, the third sample URLs correspond to different pieces of user equipment, each of the identifier parts is included in a non-Host part of each of the third sample URLs, and the non-Host part is a part in a character string of the URL except a Host part.

With reference to the first aspect and the foregoing implementation manners of the first aspect, in a seventh implementation manner of the first aspect, Host parts of the caching URLs are the same.

With reference to the first aspect and the foregoing implementation manners of the first aspect, in an eighth implementation manner of the first aspect, the non-Host part includes a Path part, and depths of Path parts of the caching URLs are the same; and the traversing a non-Host part of the target URL includes: when a depth of a Path part of the target URL is the same as the depth of the Path part of each of the caching URLs, traversing the non-Host part of the target URL.

With reference to the first aspect and the foregoing implementation manners of the first aspect, in a ninth implementation manner of the first aspect, the method further includes: receiving at least one verification URL, where a non-Host sub character string of the at least one verification URL includes a character string of the identifier part of each of the caching URLs; forwarding the at least one verification URL to the video server; receiving a verification video that is sent by the video server according to the at least one verification URL; and determining that the verification video is the same as the cached video.

With reference to the first aspect and the foregoing implementation manners of the first aspect, in a tenth implementation manner of the first aspect, the cached video belongs to the third video.

According to a second aspect, a gateway device is provided, where one side of the gateway device is communicatively connected to one or more video servers, and the other side of the gateway device is also communicatively connected to one or more pieces of user equipment; the gateway device is communicatively connected to a caching device, or, a caching device is integrated in the gateway device; the one or more pieces of user equipment include a second user equipment; the one or more video servers include a target video server; and the gateway device includes: a receiving unit, configured to receive a target URL sent by the second user equipment; a determining unit, configured to determine, from the caching device, a second video corresponding to the target URL, determine a segmentation part of the target URL according to a segmentation part extraction model, and determine a target video segmentation from the second video according to the segmentation part of the target URL, where the second video is from the target video server, the segmentation part extraction model is used to indicate a segmentation part of a uniform resource locator URL, and the segmentation part is used to indicate a range of a video segmentation in an original video; and a sending unit, configured to send the target video segmentation to the second user equipment.

With reference to the second aspect, in a first implementation manner of the second aspect, the receiving unit is further configured to receive a first sample URL and a second sample URL that are from a first user equipment, where the first sample URL and the second sample URL both correspond to a first video; and the determining unit is further configured to determine a first sample information set according to the first sample URL, determine a second sample information set according to the second sample URL, compare the first sample information set with the second sample information set according to the segmentation part extraction condition, to determine segmentation information meeting the segmentation part extraction condition, and determine the segmentation part extraction model according to the segmentation information.

With reference to the second aspect and the foregoing implementation manner of the second aspect, in a second implementation manner of the second aspect, the first sample URL includes a Path part and a Query Param part; the Query Param part of the first sample URL includes K Query Params; the first sample information set includes at least one of the following: first information and second information; the first information is used to indicate a depth and a Path value of the Path part of the first sample URL; the second information is used to indicate names and parameter values of the K Query Params in the first sample URL; the second sample URL includes a Path part and a Query Param part; the Query Param part of the second sample URL includes M Query Params; the second sample information set includes at least one of the following: third information and fourth information; the third information is used to indicate a depth and a Path value of the Path part of the second sample URL; and the fourth information is used to indicate names and parameter values of the M Query Params in the second sample URL.

With reference to the second aspect and the foregoing implementation manners of the second aspect, in a third implementation manner of the second aspect, the segmentation part extraction condition includes at least one of the following: a first condition, a second condition, and a third condition, where the first condition is: a depth of a Path part indicated by the segmentation information is the same in the first sample information set and the second sample information set, and a Path value indicated by the segmentation information is different in the first sample information set and the second sample information set; the second condition is: a name of a Query Param indicated by the segmentation information belongs to both the first sample information set and the second sample information set, and a parameter value of a Query Param indicated by the segmentation information is different in the first sample information set and the second sample information set; and the third condition is: a name of a Query Param indicated by the segmentation information belongs to only one of the following: the first sample information set and the second sample information set.

With reference to the second aspect and the foregoing implementation manners of the second aspect, in a fourth implementation manner of the second aspect, in an aspect of receiving the first sample URL and the second sample URL that are from the first user equipment, the receiving unit is specifically configured to receive the first sample URL in a first period of time, and receive the second sample URL in a second period of time, where an interval between the first period of time and the second period of time is determined according to a length of the first video.

With reference to the second aspect and the foregoing implementation manners of the second aspect, in a fifth implementation manner of the second aspect, the determining unit is further configured to determine an identifier part extraction model used to indicate an identifier part of a URL, determine, according to the identifier part extraction model, an identifier part of each caching URL of a cached video in the caching device, traverse a non-Host part of the target URL, and if it is determined that the non-Host part of the target URL includes a character string of an identifier part of at least one of the caching URLs, determine that the cached video is the second video, where each of the caching URLs corresponds to the cached video.

With reference to the second aspect and the foregoing implementation manners of the second aspect, in a sixth implementation manner of the second aspect, the identifier part extraction model is determined according to identifier parts of at least two third sample URLs, the third sample URLs all correspond to a third video, the third sample URLs have different character strings, identifier parts of the third sample URLs have a same character string, the third sample URLs correspond to different pieces of user equipment, each of the identifier parts is included in a non-Host part of each of the third sample URLs, and the non-Host part is a part in a character string of the URL except a Host part.

With reference to the second aspect and the foregoing implementation manners of the second aspect, in a seventh implementation manner of the second aspect, the non-Host part includes a Path part, and depths of Path parts of the caching URLs are the same; and in an aspect of traversing the non-Host part of the target URL, the determining unit is specifically configured to: when a depth of a Path part of the target URL is the same as the depth of the Path part of each of the caching URLs, traverse the non-Host part of the target URL.

With reference to the second aspect and the foregoing implementation manners of the second aspect, in an eighth implementation manner of the second aspect, the non-Host part includes a Path part and a Query Param part; and the determining unit is further configured to acquire a parameter name of a query parameter that is included in a Query Param part of each of the caching URLs, to generate a parameter name set; and determine that a parameter name of a query parameter that is included in a Query Param part of the target URL belongs to the parameter name set.

According to a third aspect, a video transmission system is provided, where the system includes: the foregoing gateway device; a piece of user equipment, configured to send a uniform resource locator URL to the gateway device, and acquire, from the gateway device, a video corresponding to the URL; and a video server, configured to receive the URL forwarded by the gateway device, determine the video corresponding to the URL, and send the video to the gateway device.

According to the video transmission method, the gateway device, and the video transmission system in the embodiments of the present disclosure, a segmentation part extraction model in a URL that is used to identify a location of a video segmentation in a complete video is acquired, so that when a target URL of a piece of user equipment that carries a segmentation part is received, a second video corresponding to the target URL can be determined from a caching device, a target video segmentation can be determined from the second video according to the segmentation part of the target URL, and the target video segmentation is sent to the user equipment. Therefore, even if a user performs a dragging action, multiple clips do not need to be acquired from a video server, and multiple clips of a same video do not need to be cached in the caching device either, so that the same video is prevented from being cached for multiple times, and further, the target video segmentation is transmitted to the user equipment relatively quickly, caching efficiency of the caching device can be improved, and a processing burden of the caching device can be reduced.

BRIEF DESCRIPTION OF DRAWINGS

To describe the technical solutions in the embodiments of the present disclosure more clearly, the following briefly introduces the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
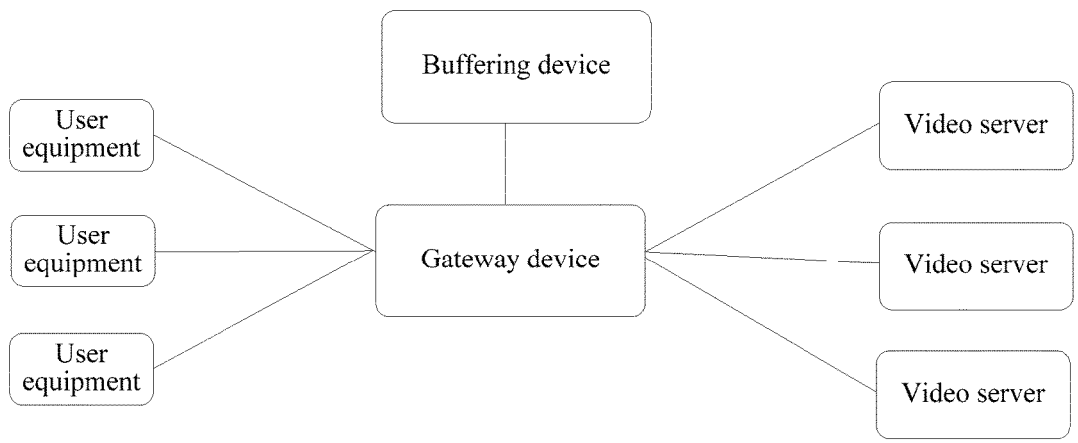
FIG. 1 is an architectural diagram of a video transmission system according to an embodiment of the present disclosure.

The following clearly describes the technical solutions in the embodiments of the present disclosure with reference to the accompanying drawings in the embodiments of the present disclosure. Apparently, the described embodiments are some but not all of the embodiments of the present disclosure.

In the technical solutions of the present disclosure, a piece of user equipment can access, by using a communications network provided by a telecommunications operator, a video server that provides a video service, and the communications network may be, for example, Global System for Mobile Communications (GSM) network, a Code Division Multiple Access (CDMA) network, Wideband Code Division Multiple Access (WCDMA) network, General Packet Radio Service (GPRS) network, and Long Term Evolution (LTE) network.

A piece of user equipment (UE) may also be referred to as a mobile terminal, a mobile user equipment, and the like, may communicate with one or more core networks (for example, a network in which the video server is located) by using the foregoing communications network (for example, a Radio Access Network (RAN)). The user equipment may be a mobile terminal, such as a mobile phone (or referred to as a "cellular" phone) and a computer with a mobile terminal. For example, the user equipment may be a portable, pocket-sized, handheld, computer built-in, or in-vehicle mobile apparatus, which exchanges voice and/or data with the radio access network.

In addition, in the embodiments of the present disclosure, an HTTP communication manner may be used between the user equipment and the video server, or information transmitted between the user equipment and the video server meets an HTTP communication rule.

For example, when a user accesses a video website by using a piece of user equipment, to watch a video, for the video that the user expects to watch (for example, the video expected by the user is learned through a clicking action of the user), the video website allocates, to the user equipment, a URL corresponding to the video, and the user equipment sends, to a video server of the video website, a request message carrying the URL, so that the video server can find the video according to the URL, and deliver the video to the user equipment.

In addition, in the embodiments of the present disclosure, communication between the user equipment and the video server is performed by using a communications network provided by a telecommunications operator. For example, a message sent by the user equipment to the video server (for example, a message for requesting to play a video segmentation) needs to be first encapsulated in a format that meets a transmission protocol of the communications network, and the message is converted, by using, for example, a gateway device of the communications network, in a format that can be identified by the video server. Similarly, after receiving the message from the gateway device, the video server may search for a video corresponding to the message, and transmit the video to the gateway device, and the gateway device may encapsulate the video in a format that meets the transmission protocol of the communications network, and deliver the video to the user equipment.

To enhance user experience and shorten a waiting time for a user to watch a video, a telecommunications operator generally disposes a caching device, to cache a video acquired from a video server, as shown in FIG. 1. It should be noted that, the caching device is generally deployed at an fixed broadband (FBB) or mobile broadband (MBB) access gateway, and the caching device is communicatively connected to the gateway device or the caching device is integrated in the gateway device. It should be noted that, that the caching device is deployed in the gateway device is only a typical application scenario of the present disclosure, and it shall not be construed as a limitation on an application scenario of the present disclosure.

A video transmission method provided by an embodiment of the present disclosure may be typically applied to a video transmission system shown in FIG. 1. According to FIG. 1, the video transmission system includes a gateway device, where one side of the gateway device is communicatively connected to one or more video servers, and the other side is communicatively connected to one or more pieces of user equipment. In addition, a caching device is further deployed in the gateway device, and the caching device may be specifically integrated in the gateway device or serve as an independent entity, and is communicatively connected to the gateway device. For ease of understanding, that the gateway device with a video caching function performs the video transmission method in this embodiment of the present disclosure is used for description. Certainly, it may be understood that, the method in the present disclosure is applicable to another scenario involving video transmission and caching.

Figure 2:
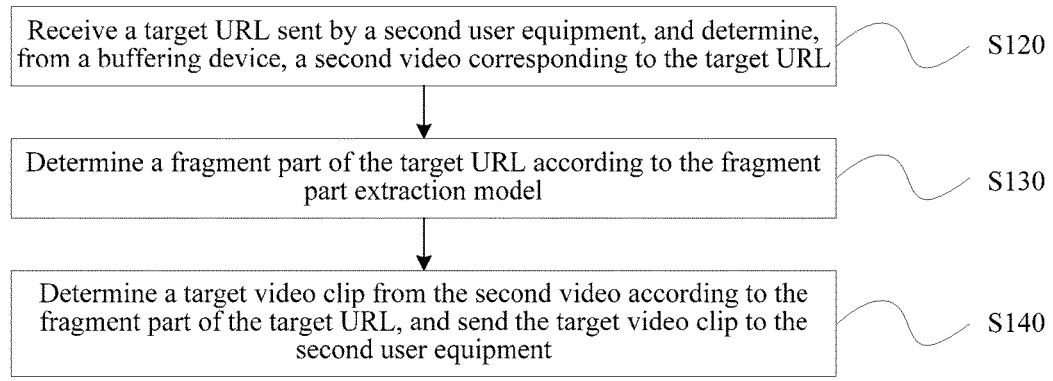
FIG. 2 is a schematic flowchart of a video transmission method according to an embodiment of the present disclosure.

FIG. 2 shows a schematic flowchart of a video transmission method 100 according to an embodiment of the present disclosure. As shown in FIG. 2, the method includes:

S120: Receive a target URL sent by a second user equipment, and determine, from a caching device, a second video corresponding to the target URL, where the second user equipment is one of at least one user equipment included in a video transmission system, the second video is from a target video server, the target video server is one of multiple video servers that are communicatively connected to a gateway device, and the second video is acquired from the target video server and cached in the caching device by the gateway device before the second user equipment sends the target URL. For example, it may be understood that, in a period of time, the target video server responds to a request that is from a piece of user equipment and that is forwarded by the gateway device, and sends the second video to the gateway device, and the gateway device forwards the second video to the user equipment. In addition, the second video is further stored in the caching device, so that in a next period of time, when a piece of user equipment requests the second video again, the second video is directly forwarded from the caching device.

S130: Determine a segmentation part of the target URL according to the segmentation part extraction model.

S140: Determine a target video segmentation from the second video according to the segmentation part of the target URL, and send the target video segmentation to the second user equipment.

Specifically, for example, when a user watches a video, if there is a dragging action, for each dragging action, a piece of user equipment generates an HTTP message and sends the HTTP message to a video server, to request a video segmentation. In addition, for each HTTP message, a segmentation part that is generated when a source video is requested to be watched and is added in a URL, and may also be referred to as a range part, to indicate a range of a video segmentation in an original video, for example, a start time and an end time of the video segmentation, or a start byte and an end byte of the video segmentation. It should be understood that, a reason why the segmentation part exists in the URL in the foregoing example is only an exemplary description, and the present disclosure is not limited thereto. For example, generally, because an original video is excessively large, a video website automatically divides the original video into multiple clips and delivers the clips to a piece of user equipment; therefore, a segmentation part that is used to identify a location of the video segmentation in the original video also exists in a URL.

Therefore, in this embodiment of the present disclosure, a sample video may be trained to obtain the segmentation part extraction model, used to indicate a segmentation part of a uniform resource locator URL; therefore, the foregoing segmentation part can be extracted from the URL corresponding to the video segmentation, and the video segmentation is captured, based on the segmentation part, from a source video of the video segmentation. Therefore, the video segmentation does not need to be cached separately.

The following first describes in detail a process of training the segmentation part extraction model.

In this embodiment of the present disclosure, the segmentation part extraction model is determined according to segmentation information. The segmentation information is determined from a first sample information set and a second sample information set by comparing, based on a segmentation part extraction condition, the first sample information set with the second sample information set. The first sample information set is determined according to a first sample URL that is from a first user equipment; the first sample URL includes a Path part and a Query Param part; the Query Param part of the first sample URL includes K Query Params; the first sample URL corresponds to a first video; the first sample information set includes at least one of the following: first information and second information; the first information is used to indicate a depth and a Path value of the Path part of the first sample URL; the second information is used to indicate names and parameter values of the K Query Params in the first sample URL; the second sample information set is determined according to a second sample URL that is from the first user equipment; the second sample URL includes a Path part and a Query Param part; the Query Param part of the second sample URL includes M Query Params; the second sample URL corresponds to the first video; the second sample information set includes at least one of the following: third information and fourth information; the third information is used to indicate a depth and a Path value of the Path part of the second sample URL; and the fourth information is used to indicate names and parameter values of the M Query Params in the second sample URL.

Preferably, the segmentation part extraction condition includes at least one of the following: a first condition, a second condition, and a third condition, where the first condition is: a depth of a Path part indicated by the segmentation information is the same in the first sample information set and the second sample information set, and a Path value indicated by the segmentation information is different in the first sample information set and the second sample information set;

the second condition is: a name of a Query Param indicated by the segmentation information belongs to both the first sample information set and the second sample information set, and a parameter value of a Query Param indicated by the segmentation information is different in the first sample information set and the second sample information set; and the third condition is: a name of a Query Param indicated by the segmentation information belongs to only one of the following: the first sample information set and the second sample information set.

In addition, optionally, before the receiving a target URL sent by a second user equipment, the method further includes: receiving the first sample URL and the second sample URL;

determining the first sample information set according to the first sample URL, and determining the second sample information set according to the second sample URL; comparing the first sample information set with the second sample information set according to the segmentation part extraction condition, to determine the segmentation information meeting the segmentation part extraction condition; and determining the segmentation part extraction model according to the segmentation information.

Specifically, in a period of time T1 (that is, an example of a first period of time), the gateway device acquires a URL#A (that is, an example of the first sample URL), where the URL#A corresponds to a piece of user equipment A (that is, an example of the first user equipment), and the URL#A corresponds to a video A (that is, an example of the first video), and for example, may be extracted by the gateway device from an HTTP message that is used to request to play the video A and that is from the user equipment A or may be extracted by the gateway device from an HTTP message that is used to request to play a clip of the video A and that is from the user equipment A.

It should be noted that, the process of acquiring the URL#A in the foregoing example is only an exemplary description, and the present disclosure is not limited thereto. For example, the URL#A may be provided by an Internet video publisher to the gateway device, as long as it can be ensured that the URL#A corresponds to the user equipment A and the URL#A corresponds to the video A. For example, in the prior art, the URL#A may be used as an index of the complete video A, or the URL#A may be used as an index of a clip of the video A.

In a URL sent by a piece of user equipment when the user equipment requests to acquire a video segmentation, the Range part corresponding to the clip generally exists in a path (or "Path") part or a query parameter (or "Query Param") part of the URL, that is, the Range part may be a Path value of a depth that is in the Path part or may be a value of a parameter that is in the Query Param part.

Therefore, in this embodiment of the present disclosure, after acquiring the URL#A, the gateway device may extract a Path part and/or a Query Param part of the URL#A.

Figures 3, 4, 5:
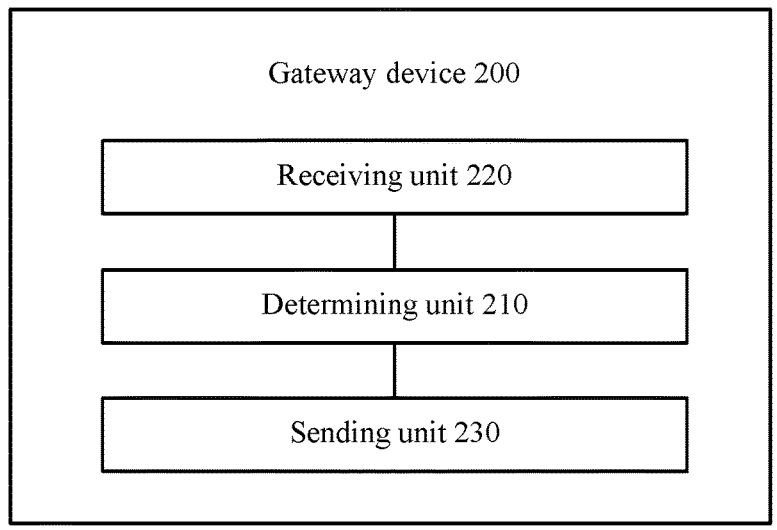
FIG. 3 is a schematic diagram indicating a division manner of each part in a URL.
FIG. 4 is a schematic diagram indicating an example of a depth and a Path value of a Path part in a URL.
FIG. 5 is a schematic block diagram of a gateway device according to an embodiment of the present disclosure.

FIG. 3 shows an example of a constitution of each part in a character string of a URL. As shown in FIG. 3, a domain name (or "Host") part and a Path part of the URL is separated by a symbol "/"; therefore, the network device may identify a character after the first symbol "/" after the Host part (or the last symbol "/" in the URL) as a start character of the Path part.

In addition, as shown in FIG. 3, the Path part and a Query Param part of the URL is separated by a symbol "?"; therefore, the network device may identify a character after the first symbol "?" after the Path part (or the last symbol "/" in the URL) as the start character of the Path part. Therefore, the Query Param part can be extracted.

In addition, the network device may identify the character after the first symbol "?" after the path part as an end character of the Path part; therefore, in combination of the start character of the Path part, the Path part can be extracted.

It should be understood that, a method for extracting the Path part and a method for extracting the Query Param part in the foregoing examples are only exemplary descriptions, and the present disclosure is not limited thereto. The methods may vary with the URL. For example, when some URLs have only a Path part but do not have a Query Param part, only a start character of the Path part needs to be determined. In addition, a delimiter (that is, the symbol "/") between the Host part and the Path part and a delimiter (that is, the symbol "?") between the Path part and the Query Param part in the foregoing examples are exemplary descriptions, and the present disclosure is not limited thereto. In the prior art, a symbol that can achieve a function of a separation identifier and that is used by a URL falls within the protection scope of the present disclosure.

After extracting the Path part of the URL#A, the gateway device may determine a depth and a Path value of the Path part of the URL#A.

Specifically, the depth (or a level) of the Path part may be determined according to a quantity of symbols "/" included in the Path part. For example, FIG. 4 shows a schematic diagram of an example of the Path part of the URL. Using the URL shown in FIG. 4 as an example, the URL includes six symbols "/", and therefore, it may be determined that a depth of the URL is 6, where a Path value of a depth at the first level is "sec (44ab57eec5d981faa33)";

a Path value of a depth at the second level is "frag(0)";

a Path value of a depth at the third level is "video";

a Path value of a depth at the fourth level is "484";

a Path value of a depth at the fifth level is "516"; and a Path value of a depth at the sixth level is "56615484_mp4_h264_aac_1.flv".

Similarly, after extracting the Query Param part of the URL#A, the gateway device may determine names and parameter values of all Query Params in the Query Param part of the URL#A.

Generally, a format of a Query Param in the URL is "NAME=VALUE", where NAME is a parameter name, and Value is a parameter value. However, the present disclosure is not limited thereto. There may be only NAME, or NAME may be empty, or VALUE may be empty, that is, the format of the Query Param in the URL may be:

"NAME=VALUE", or

"NAME", or

"NAME=", or

"=VALUE".

Specifically, using the URL shown in FIG. 3 as an example, the URL includes nine symbols "&", and therefore, it may be determined that the URL includes nine Query Params, where a character string corresponding to the first Query Param is "4", which indicates that a parameter name of the first Query Param is "4" and a parameter value of the first Query Param is empty;

a character string corresponding to the second Query Param is "ipbits=0", which indicates that a parameter name of the second Query Param is "ipbits" and a parameter value of the second Query Param is "0";

a character string corresponding to the third Query Param is "signature=.BC606865625583C2BE5AA6472A7536D82 7ED7E58", which indicates that a parameter name of the third Query Param is "signature", and a parameter value of the third Query Param is ".BC606865625583C2BE5AA6472A7536D827ED7E58";

a character string corresponding to the fourth Query Param is "sver=3", which indicates that a parameter name of the fourth Query Param is "sver" and a parameter value of the fourth Query Param is "3";

a character string corresponding to the fifth Query Param is "expire=1252105200", which indicates that a parameter name of the fifth Query Param is "expire" and a parameter value of the fifth Query Param is "1252105200";

a character string corresponding to the sixth Query Param is "key=yt1", which indicates that a parameter name of the sixth Query Param is "key" and a parameter value of the sixth Query Param is "yt1";

a character string corresponding to the seventh Query Param is "factor=1.25", which indicates that a parameter name of the seventh Query Param is "factor" and a parameter value of the seventh Query Param is "1.25";

a character string corresponding to the eighth Query Param is "burst=40", which indicates that a parameter name of the eighth Query Param is "burst" and a parameter value of the eighth Query Param is "40"; and a character string corresponding to the ninth Query Param is "id=c19764dece17ab", which indicates that a parameter name of the ninth Query Param is "id" and a parameter value of the ninth Query Param is "c19764dece17ab".

Therefore, as described above, the depth and the Path value of the Path part of the URL#A and the name and the parameter value of each Query Param in the Query Param part of the URL#A may be determined, and the foregoing information is recorded to generate the first sample information set.

In a period of time T2 (that is, an example of a second period of time), the gateway device acquires a URL#B (that is, an example of the second sample URL), where the URL#B corresponds to the user equipment A (that is, an example of the first user equipment), and the URL#B corresponds to the video A (that is, an example of the first video), and for example, may be extracted by the gateway device from an HTTP message that is used to request to play the video A and that is from the user equipment A or may be extracted by the gateway device from an HTTP message that is used to request to play a clip of the video A and that is from the user equipment A.

It should be noted that, in URLs allocated by the video website to different clips from a same video that are requested by a same user, generally, only Range parts (for example, character strings indicating a start time of the video) are different. Therefore, to accurately determine the Range parts, it needs to ensure that the URL#A and the URL#B correspond to different clips of the same video (that is, the foregoing video A). For example, the URL#A corresponds to the complete video A and the URL#B corresponds to a clip of the video A, or the URL#A corresponds to a clip of the video A and the URL#B corresponds to the complete video, or the URL#A corresponds to a clip of the video A and the URL#B corresponds to another clip of the video A.

In this embodiment of the present disclosure, an online sampling manner may be used. When a video is forwarded for a user, a Rang part extraction model is obtained through training; therefore, accuracy of the Rang part extraction model can be improved by enabling the URL#A and the URL#B to correspond to the same video (that is, the foregoing video A).

In this embodiment of the present disclosure, it may be determined, according to a moment at which the URL#A is acquired and a moment at which the URL#B is acquired, whether the URL#A and the URL#B correspond to the same video.

That is, optionally, the receiving the first sample URL and the second sample URL includes:

receiving the first sample URL in a first period of time, and receiving the second sample URL in a second period of time, where an interval between the first period of time and the second period of time is determined according to a length of the first video.

Specifically, if the gateway device first receives the URL#A, the video A corresponding to the URL#A may be determined (herein, the URL#A may correspond to the complete video A or may correspond to a clip of the video A), where the video A may be acquired by the gateway device from the video server, or may be acquired by the gateway device from a cached video by using an identifier part of the URL#A (subsequently, an example in which the second video corresponding to the target URL is determined is used to describe the process in detail). Then, a total length of the video A (that is, the length of the first video) may be determined. Therefore, a determining range (that is, a preset range) may be determined, a start time of the determining range is the moment at which the URL#A is received, and a length of the determining range is the total length of the video A.

If the moment at which the URL#B is received is within the determining range, and the URL#B is also from the user equipment A, it may be considered that the URL#A and the URL#B correspond to the same video. A URL that is received at a moment outside the determining range cannot be used as the URL#B.

According to the video transmission method in this embodiment of the present disclosure, an interval between a moment at which the first sample URL is acquired and a moment at which the second sample URL is acquired is within a preset range, and the preset range is determined according to the length of the first video corresponding to both the first sample URL and the second sample URL, so that it can be ensured that the first sample URL and the second sample URL correspond to different clips of the first video, thereby improving validity of the Rang part extraction model.

It should be understood that, a method for determining that the URL#A and the URL#B correspond to the same video in the foregoing example is only an exemplary description, and the present disclosure is not limited thereto. For example, identifier parts of the URL#A and the URL#B may be extracted according to an identifier part extraction model that is determined subsequently, and after it is determined that the identifier parts of the URL#A and the URL#B are the same, it is determined that the URL#A and the URL#B correspond to the same video. Subsequently, a process of determining an identifier part of a URL#C and a corresponding video C is used as an example for a detailed description.

After acquiring the URL#B, the gateway device may extract a Path part and/or a Query Param part of the URL#B, and may determine a depth and a Path value of the Path part of the URL#B and names and parameter values of all Query Params in the Query Param part of the URL#B, and record the foregoing information to generate the second sample information set. The process is similar to the foregoing processing process for the URL#A, and herein, a detailed description thereof is omitted to avoid repetition.

Optionally, the first sample URL is a URL that is sent by the first user equipment when the first user equipment requests to acquire the first video.

Specifically, in this embodiment of the present disclosure, the URL#A may be a URL that is delivered by the video website to the user equipment when the user requests to watch the complete video (for example, when the user clicks a play icon). The URL#B may be a URL that is delivered by the video website to the user equipment when the user performs a dragging action, so that it can be ensured that character strings that are different in the URL#B and the URL#A are related to the dragging action, thereby improving accuracy of the Rang part extraction model in this embodiment of the present disclosure.

Optionally, hostname Host parts of the first sample URL and the second sample URL have a same character string.

Specifically, a same video website generally uses a same rule when generating a URL. For example, for two video segmentations, levels of Path parts or names of Query Params that are used to indicate locations of the clips in a source video generally are the same. Therefore, URLs with a same Host part are selected as the URL#A and the URL#B, so that it can be ensured that video websites that generate the URL#A and the URL#B are the same, thereby improving accuracy of the Rang part extraction model.

Then, compare the first sample information set with the second sample information set, to determine the Rang part extraction model.

The foregoing case in which a URL has only a Path part but does not have a Query Param part may exist; therefore, a case in which the first sample information set and the second sample information set both include only a depth and a Path value of a Path part (that is, a case 1) may exist, or a case in which the first sample information set and the second sample information set both include a depth and a Path value of a Path part and names and parameter values of all Query Params of a Query Param part (that is, a case 2) may exist.

The following describes processing for the foregoing two cases.

Case 1

The gateway device may traverse Path values of depths at all levels in the Path parts of the URL#A and the URL#B, and when the Path parts of the URL#A and the URL#B have a same depth, or the Path parts include a same quantity of levels, comparison is performed level by level. For example, Path values at the first levels in the Path parts of the URL#A and the URL#B, that is, character strings between the first symbols "/" and the second symbols "/", may be compared first, and then, Path values at the second levels in the Path parts of the URL#A and the URL#B, that is, character strings between the second symbols "/" and the third symbols "/", are compared, and the rest can be deduced by analogy.

Therefore, levels with different path values in the URL#A and the URL#B and the different Path values can be determined, which corresponds to the first condition.

For example, assuming that the Path part of the URL#A is: /sec(44ab57eec5d981faa33)/frag(0)/video/484/516/56615484_mp4_h264_aac_1.flv, and the Path part of the URL#B is: /sec(44ab57eec5d981faa33)/frag (1)/video/484/516/56615484_mp4_h264_aac_1.flv, the gateway device may determine that the levels with different path values in the URL#A and the URL#B are the second levels, and the different path values in the URL#A and the URL#B are frag(0) and frag (1).

Therefore, the gateway device may determine that the video website that publishes the video A uses the second level (that is, frag) in the Path part of the URL to identify a clip of the video. For example, the gateway device may determine that a value of "frag" is used to indicate a start time or an end time of the video segmentation relative to the complete video.

Further, it may be determined that the Rang part extraction model is used to extract the path value at the second level in the Path part of the URL.

Case 2

For example, in this embodiment of the present disclosure, a case in which the first sample information set and the second sample information set have a same quantity of Query Params may exist, that is, videos corresponding to the URL#A and the URL#B are different video segmentations of the same video. Therefore, generally the quantities of the Query Params in the Query Param parts of the URL#A and the URL#B or quantities of parameter names of the Query Params are the same.

In this case, Query Params with a same parameter name but with different parameter values are compared, so that a parameter name used to identify a clip of a video can be determined, which corresponds to the second condition.

For example, assuming that the Query Param part of the URL#A is:

10200&key=25b11c805e36d6aef3038550860c680040cdaa4201&playtype=1&tk=15501270071993578718002220&brt=3&bc=0&nt=0&du=538470&sz=179904090&tflvbeg in=18055261, and the Query Param part of the URL#B is:

10200&key=25b11c805e36d6aef3038550860c680040cdaa4201&playtype=1&tk=15501270071993578718002220&brt=3&bc=0&nt=0&du=538470&sz=213602090&tflvbeg in=28941773, the gateway device may determine that parameter values of Query Params with parameter names of "sz" and "tflvbegin" in the URL#A and the URL#B are different.

Therefore, the gateway device may determine that the video website that publishes the video A uses parameters "sz" and "tflvbegin" in the Query Param part of the URL to identify a clip of a video. For example, the gateway device may determine that the parameter values of "sz" and "tflvbegin" are used to indicate a length and a start time of the video segmentation relative to the complete video.

Further, the gateway device may determine that the segmentation part extraction model is used to extract the parameter "sz" and the parameter "tflvbegin" in the Query Param part of the URL.

For another example, in this embodiment of the present disclosure, a case in which the first sample information set and the second sample information set have different quantities of Query Params may also exist. For example, the URL#A corresponds to the complete video A and the URL#B corresponds to a clip of the video A, and the URL#A may be a URL that is delivered by the video website to the user equipment when the user requests to watch the complete video (for example, when the user clicks the play icon). The URL#B may be a URL that is delivered by the video website to the user equipment when the user performs a dragging action; therefore, quantities of the Query Params in the Query Param parts of the URL#A and the URL#B or the quantities of the parameter names of the Query Params may be different, which corresponds to the third condition.

For example, assuming that the Query Param part of the URL#A is:

10200&key=25b11c805e36d6aef3038550860c680040cdaa4201&playtype=1&tk=15501270071993578718002220&brt=3&bc=0&nt=0&du=538470, and the Query Param part of the URL#B is:

10200&key=25b11c805e36d6aef3038550860c680040cdaa4201&playtype=1&tk=15501270071993578718002220&brt=3&bc=0&nt=0&du=538470&sz=179904090&tflvbeg in=18055261, the gateway device may determine that the Query Params with the parameter names of "sz" and "tflvbegin" in the URL#B do not exist in the URL#A.

Therefore, the gateway device may determine that the video website that publishes the video A uses the parameters "sz" and "tflvbegin" in the Query Param part of the URL to identify a clip of a video. For example, the gateway device may determine that the parameter values of "sz" and "tflvbegin" are used to indicate a length and a start time of the video segmentation relative to the complete video.

Further, the gateway device may determine that the Rang part extraction model is used to extract the parameter "sz" and the parameter "tflvbegin" in the Query Param part of the URL.

It should be noted that, in the foregoing embodiment, the process of obtaining the Rang part extraction model through training by using two URLs is described by using an example, but the present disclosure is not limited thereto, and more URLs may be used to obtain the Rang part extraction model through training. For example, after different parts (which include different Path levels and different Path values, and/or, different names and different parameter values of Query Params, and for ease of differentiation, are denoted as different parts A) are determined by comparing the URL#A and the URL#B, a URL#Y may be further acquired. The URL#Y corresponds to the user equipment A (that is, an example of the first user equipment), and the URL#Y corresponds to the video A. A process of acquiring the URL#Y is similar to the process of acquiring the URL#A and the process of acquiring the URL#B, and herein, a detailed description thereof is omitted to avoid repetition. Then, the URL#Y may be compared with the URL#A or the URL#Y may be compared with the URL#B, to find different parts (which include different Path levels and different Path values, and/or, different names and different parameter values of Query Params, and for ease of differentiation, are denoted as different parts B). The different parts A are compared with the different parts B, a same part (which includes a same Path level and a same Path value, and a same name and a same parameter value of a Query Param) is removed, and remaining parts are used as a training basis for the Rang part extraction model, so that accuracy of the Rang part extraction model in the present disclosure can be further improved.

In addition, as described above, each character string in the Rang part may include multiple parameters, for example, "sz" and "tflvbegin", and the multiple parameters may indicate a length and a start time of the video segmentation relative to the complete video. Therefore, a specific function of each parameter needs to be determined, for example, whether "sz" indicates the length (or the start time) or the "tflvbegin" indicates the length (or the start time).

As an example rather than a limit, the specific function of each parameter may be determined through verification. Specifically, for example, the gateway device may acquire a URL#W corresponding to a video segmentation of a video W, and use the Rang part extraction model to obtain a Rang part of the URL#W. For example, the gateway device may assume that in the URL#W, "sz" indicates a length and "tflvbegin" indicates a start time, and therefore, the gateway device can acquire a video segmentation W1 from the cached video W. In addition, the URL#W may be sent to the video server, and therefore, an accurate video segmentation W2 can be obtained from the video server. If the video segmentation W1 is the same as the video segmentation W2, it may be determined that the assumption is valid, that is, "sz" indicates the length and "tflvbegin" indicates the start time; if the video segmentation W1 is different from the video segmentation W2, it may be determined that "sz" indicates the start time and "tflvbegin" indicates a degree.

For another example, the gateway device may acquire a URL#M1 and a URL#M2 that correspond to multiple video segmentations of a video M (herein, for ease of understanding, two video segmentations, that is, a video segmentation M1 and a video segmentation M2, are used as an example), and the Rang part extraction model can be used to obtain Range parts of the URL#M1 and the URL#M2. For example, the gateway device may assume that in the URL#M1 and the URL#M2, "sz" indicates a length and "tflvbegin" indicates a start time, and therefore, the gateway device can calculate, according to the Range parts of the URL#M1 and the URL#M2, a length (which is referred to as a calculated length) of the video M, and the gateway device may learn the length (which is referred to as an actual length) of the video M from a video summary of the URL#M1 or the URL#M2, and if the calculated length is the same as the actual length, it may be determined that the assumption is valid.

After the Rang part extraction model is acquired above, in S140, when receiving the URL#C (that is, an example of the target URL) that is sent by a piece of user equipment C (that is, an example of the second user equipment), the gateway device may acquire a video C (that is, an example of the second video) corresponding to the URL#C.

It should be noted that, in this embodiment of the present disclosure, the user equipment C may include the user equipment A, so that the URL#C may be the same as the URL#A or the URL#B or may be different from the URL#A or the URL#B, that is, the second user equipment may be the same as or different from the first user equipment, which is not particularly limited in the present disclosure; and the video C may be the same as the video A or may be different from the video A, which is not particularly limited in the present disclosure.

In addition, in the foregoing description, that the gateway device executes the process of determining the segmentation part extraction model is used for description, but the present disclosure is not limited thereto, and another device may also execute the process of determining the segmentation part extraction model to obtain the segmentation part extraction model and then send the segmentation part extraction model to the gateway device.

The following describes in detail the method for determining the video C corresponding to the URL#C.

Optionally, the determining, from the caching device, a second video corresponding to the target URL includes:

determining an identifier part extraction model, where the identifier part extraction model is used to indicate a identifier part of a URL;

determining, according to the identifier part extraction model, an identifier part of each caching URL of a cached video in the caching device, where each caching URL corresponds to the cached video; and traversing a non-Host part of the target URL, and if it is determined that the non-Host part of the target URL includes a character string of an identifier part of at least one of the caching URLs, determining that the cached video is the second video.

Specifically, when a user requests to watch a video, a piece of user equipment generates an HTTP message and sends the HTTP message to the video server, to obtain the video from the video server, where the HTTP message carries a URL that is allocated by the video website to the user equipment when the user requests to watch the video (for example, clicking a play icon) and that corresponds to the video, and when different users access a same video or a same user accesses a same video at different moments, different URLs may be acquired. If a complete URL is used as an index to cache content, a same video may be repeatedly cached, and a hit ratio for the cached video is relatively low.

For a same video, same content exists in multiple URLs (for example, multiple URLs used when different user access the same video, or multiple URLs used by a same user to access the same video at multiple moments). For example, the content may be some continuous character strings in the URL, that is, an identifier part.

Therefore, if the identifier part is used to replace a complete URL to index a cached video, a case in which the same video is repeatedly cached can be prevented, and a hit ratio for the cached video can be greatly improved.

In this embodiment of the present disclosure, the identifier part extraction model used to extract the identifier part from the URL may be obtained through training by using a sample URL (that is, a third sample URL).

That is, optionally, the identifier part extraction model is determined according to identifier parts of at least two third sample URLs, the third sample URLs all correspond to a third video, the third sample URLs have different character strings, identifier parts of the third sample URLs have a same character string, the third sample URLs correspond to different pieces of user equipment, each of the identifier parts is included in a non-Host part of each of the third sample URLs, and the non-Host part is a part in a character string of the URL except a Host part.

Specifically, in this embodiment of the present disclosure, URLs that are from different pieces of user equipment and that correspond to a same video (which is denoted as a video D for ease of differentiation) may be used as the third sample URLs. In addition, in this embodiment of the present disclosure, there may be two or more third sample URLs, and for ease of understanding and description, an example in which the third sample URLs are a URL#D and a URL#E is used for description.

The URL#D corresponds to a piece of user equipment D, and the URL#D corresponds to the video D. For example, the URL#D may be extracted by the gateway device from an HTTP message that is used to request to play the video D and that is from the user equipment D or may be extracted by the gateway device from an HTTP message that is used to request to play a clip of the video D and that is from the user equipment D.

The URL#E corresponds to a piece of user equipment E, and the URL#E corresponds to the video D. For example, the URL#E may be extracted by the gateway device from an HTTP message that is used to request to play the video D and that is from the user equipment E or may be extracted by the gateway device from an HTTP message that is used to request to play a clip of the video D and that is from the user equipment E.

It should be noted that, the process of acquiring the URL#D and the process of acquiring the URL#E in the foregoing examples are only exemplary descriptions, and the present disclosure is not limited thereto. For example, the URL#D may be provided by an Internet video publisher to the gateway device, as long as it can be ensured that the URL#D corresponds to the user equipment D and the URL#D corresponds to the video D (for example, in the prior art, the URL#D may be used as an index of the complete video D, or the URL#D may be used as an index of a clip of the video D).

Similarly, the URL#E may be provided by an Internet video publisher to the gateway device, as long as it can be ensured that the URL#E corresponds to the user equipment E and the URL#E corresponds to the video D (for example, in the prior art, the URL#E may be used as an index of the complete video D, or the URL#E may be used as an index of a clip of the video D).

In addition, in this embodiment of the present disclosure, it needs to ensure that the URL#D and the URL#E correspond to a same video (that is, the video D). As an implementation method, a video summary D of the video corresponding to the URL#D and a video summary E of the video corresponding to the URL#E may be determined, and when it is determined that the video summary D is the same as the video summary E, it may be determined that the URL#D and the URL#E correspond to the same video.

In a URL sent by a piece of user equipment when the user equipment requests to acquire a video or a video segmentation, the identifier part corresponding to the video generally exists in a path (or "Path") part or a query parameter (or "Query Param") part of the URL, that is, the identifier part may be a Path value of a depth that is in the Path part or may be a value of a parameter that is in the Query Param part.

Therefore, in this embodiment of the present disclosure, after acquiring the URL#D and the URL#E, the gateway device may extract a Path part and/or a Query Param part of the URL#D and a Path part and/or a Query Param part of the URL#E.

FIG. 3 shows an example of a constitution of each part in a character string of a URL. As shown in FIG. 3, a domain name (or "Host") part and a Path part of the URL is separated by a symbol "/"; therefore, the network device may identify a character after the first symbol "/" after the Host part (or the last symbol "/" in the URL) as a start character of the Path part.

In addition, as shown in FIG. 3, the Path part and a Query Param part of the URL is separated by a symbol "?"; therefore, the network device may identify a character after the first symbol "?" after the Path part (or the last symbol "/" in the URL) as the start character of the Path part. Therefore, the Query Param part can be extracted.

In addition, the network device may identify the character after the first symbol "?" after the path part as an end character of the Path part; therefore, in combination of the start character of the Path part, the Path part can be extracted.

It should be understood that, a method for extracting the Path part and a method for extracting the Query Param part in the foregoing examples are only exemplary descriptions, and the present disclosure is not limited thereto. The methods may vary with the URL. For example, when some URLs have only a Path part but do not have a Query Param part exists, only a start character of the Path part of needs to be determined. In addition, a delimiter (that is, the symbol "/") between the Host part and the Path part and a delimiter (that is, the symbol "?") between the Path part and the Query Param part in the foregoing examples are exemplary descriptions, and the present disclosure is not limited thereto. In the prior art, a symbol used by a URL that can achieve a function of a separation identifier falls within the protection scope of the present disclosure.

After extracting the Path parts of the URL#D and the URL#E, the gateway device may determine a depth and a Path value of the Path part of the URL#D.

Specifically, the depth (or a level) of the Path part may be determined according to a quantity of symbols "/" included in the Path part. For example, FIG. 4 shows a schematic diagram of an example of the Path part of the URL. Using the URL shown in FIG. 4 as an example, the URL includes six symbols "/", and therefore, it may be determined that a depth of the URL is 6, where a Path value of a depth at the first level is "sec (44ab57eec5d981faa33)";

a Path value of a depth at the second level is "frag(0)";

a Path value of a depth at the third level is "video";

a Path value of a depth at the fourth level is "484";

a Path value of a depth at the fifth level is "516"; and a Path value of a depth at the sixth level is "56615484_mp4_h264_aac_1.flv".

Similarly, after extracting the Query Param part of the URL#D, the gateway device may determine names and parameter values of all Query Params in the Query Param part of the URL#A.

Generally, a format of a Query Param in the URL is "NAME=VALUE", where NAME is a parameter name, and Value is a parameter value. However, the present disclosure is not limited thereto, there may be only NAME, or NAME may be empty, or VALUE may be empty, that is, the format of the Query Param in the URL may be:

"NAME=VALUE", or

"NAME", or

"NAME=", or

"=VALUE".

Specifically, using the URL shown in FIG. 3 as an example, the URL includes nine symbols "&", and therefore, it may be determined that the URL includes nine Query Params, where a character string corresponding to the first Query Param is "4", which indicates that a parameter name of the first Query Param is "4" and a parameter value of the first Query Param is empty;

a character string corresponding to the second Query Param is "ipbits=0", which indicates that a parameter name of the second Query Param is "ipbits" and a parameter value of the second Query Param is "0";

a character string corresponding to the third Query Param is "signature=.BC606865625583C2BE5AA6472A7536D82 7ED7E58", which indicates that a parameter name of the third Query Param is "signature", and a parameter value of the third Query Param is ".BC606865625583C2BE5AA6472A7536D827ED7E58";

a character string corresponding to the fourth Query Param is "sver=3", which indicates that a parameter name of the fourth Query Param is "sver" and a parameter value of the fourth Query Param is "3";

a character string corresponding to the fifth Query Param is "expire=1252105200", which indicates that a parameter name of the fifth Query Param is "expire" and a parameter value of the fifth Query Param is "1252105200";

a character string corresponding to the sixth Query Param is "key=yt1", which indicates that a parameter name of the sixth Query Param is "key" and a parameter value of the sixth Query Param is "yt1";

a character string corresponding to the seventh Query Param is "factor=1.25", which indicates that a parameter name of the seventh Query Param is "factor" and a parameter value of the seventh Query Param is "1.25";

a character string corresponding to the eighth Query Param is "burst=40", which indicates that a parameter name of the eighth Query Param is "burst" and a parameter value of the eighth Query Param is "0"; and a character string corresponding to the ninth Query Param is "id=c19764dece17ab", which indicates that a parameter name of the ninth Query Param is "id" and a parameter value of the ninth Query Param is "c19764dece17ab".

Therefore, as described above, depths and Path values of the Path parts of the URL#D and the URL#E and names and parameter values of all Query Params in the Query Param parts of the URL#D and the URL#E may be determined.

The foregoing case in which the URL has only a Path part but does not have a Query Param part may exist; therefore, a case in which the URL#D and the URL#E both include only the depth and the Path value of the Path part (that is, a case 3) may exist, or a case in which the URL#D and the URL#E both include the depth and the Path value of the Path part and the names and the parameter values of all the Query Params of the Query Param part (that is, a case 4) may exist.

The following describes processing for foregoing two cases.

Case 3

The gateway device may traverse Path values of depths at all levels in the Path parts of the URL#D and the URL#E, when the Path parts of the URL#D and the URL#E have a same depth, or the Path parts include a same quantity of levels, comparison is performed level by level. For example, Path values at the first levels in the Path parts of the URL#D and the URL#E, that is, character strings between the first symbols "/" and the second symbols "/", may be compared first, and then, Path values at the second levels in the Path parts of the URL#D and the URL#E, that is, character strings between the second symbols "/" and the third symbols "/", are compared, and the rest can be deduced by analogy.

Therefore, levels with a same path value in the URL#D and the URL#E and the same Path value can be determined.

For example, assuming that the Path part of the URL#D is: /sec(44ab57eec5d981faa33)/frag(0)/video/484/516/56615484_mp4_h264_aac_1.flv; and the Path part of the URL#E is:

/sec(98ac09efd2e662cef97)/frag(0)/video/580/720/56615484_mp4_h264_aac_1.flv, the gateway device may determine that levels with same path values in the URL#D and the URL#E are the second level, the third level, and the fifth level.

Therefore, the gateway device may determine that the video website that publishes the video D uses the second level, the third level, and the fifth level in the Path part of the URL to identify a clip of the video. For example, the gateway device may determine that values at the second level, the third level, and the fifth level in the Path part are used to indicate the video D.

Further, it may be determined that the identifier part extraction model is used to extract the Path values at the second level, the third level, and the fifth level in the Path part of the URL.

Optionally, the method further includes:

acquiring a fourth sample URL and a fourth video, where the fourth sample URL corresponds to the fourth video, and the fourth video is different from the third video;

determining an identifier part of the fourth sample URL according to the identifier part extraction model;

determining an overlapping part between the identifier part of the fourth sample URL and an identifier part of the third sample URL, where the overlapping part includes Path levels with a same Path value and/or Query Params with a same parameter value;

removing the overlapping part from the identifier part of the third sample URL, to update the identifier part of the third sample URL; and updating the identifier part extraction model according to the updated identifier part of the third sample URL.

Specifically, to further improve accuracy of the foregoing determined identifier part extraction model, a URL#N (an example of the fourth sample URL) corresponding to a video N (an example of the fourth video) may be further acquired, where video websites that publish the video N and the video D are the same, and the video N is different from the video D (for example, video summaries are different).

For example, assuming that a Path part of the URL#N is: /sec(74cf57abe5f336fbe78)/frag(0)/video/665/896/91362310_wma_p135_aac_8.flv, the gateway device may determine that levels with a same path value in the URL#N, the URL#D, and the URL#E are the second level and the third level, and further, may determine that the second levels and the third levels in the Path parts cannot be used to differentiate the videos.

Therefore, the gateway device may determine that the video website that publishes the video D and the video N use the fifth levels in the Path parts of the URLs to identify clips of the videos. For example, the gateway device may determine that a value at the fifth level in the Path part of the URL#D is used to indicate the video D.

Further, it may be determined that the identifier part extraction model is used to extract the Path value at the fifth level in the Path part of the URL.

Case 4

The gateway device may traverse the parameter values of all the Query Params in the Query Param parts of the URL#D and the URL#E, so that Query Params with a same parameter value in the URL#D and the URL#E and the same Path value can be determined.

For example, assuming that the Query Param part of the URL#D is:

4&ipbits=0&signature=.BC606865625583C2BE5AA6472A7536D827ED7E58&sver=3&expire=1252105200&key=yt1&factor=1.25&burst=40&id=c19764dece17ab, and the Query Param part of the URL#E is:

5&ipbits=1&signature=9879DD9541B65704625CAB118092DFD151856C&sver=4&expire=1252105201&key=yt1&factor=2.25&burst=50&id=c19764dece17ab, the gateway device may determine that Query Params with parameter names of "key" and "id" in the URL#D and the URL#E have a same parameter value.

Therefore, the gateway device may determine that the video website that publishes the video D identifies the video by using parameters "key" and "id" in the Query Param part of the URL. For example, the gateway device may determine that parameter values of "key" and "id" are used to indicate the video D.

Further, the gateway device may determine that the identifier part extraction model is used to extract the parameters "key" and "id" in the Query Param part of the URL.

In case 4, a method and a process for obtaining the identifier part extraction model through training based on the Path part are similar to those in case 3, and herein, a description thereof is omitted to avoid repetition.

In addition, a same video website generally uses a same rule when generating a URL. For example, in different URLs generated when different pieces of user equipment request to watch a same video, levels or names of Query Params that are used to identify a Path part of the video generally are the same. Therefore, URLs with a same Host part are selected as the URL#D and the URL#E, so that it can be ensured that the video websites that generate the URL#D and the URL#E are the same, thereby improving accuracy of the identifier part extraction model.

It should be noted that, in the foregoing embodiment, a process of obtaining the identifier part extraction model through training by using two URLs is described by using an example, but the present disclosure is not limited thereto, and more URLs may be used to obtain the identifier part extraction model through training. For example, after a same part (which includes a same Path level and a same Path value, and/or, a same name and a same parameter value of a Query Param, and for ease of differentiation, is denoted as a same part A) is determined by comparing the URL#D and the URL#E, a URL#Z may be further acquired. The URL#Z corresponds to a piece of user equipment Z, and the URL#Z corresponds to the video D. A process of acquiring the URL#Y is similar to the process of acquiring the URL#A and the process of acquiring the URL#B, and herein, a detailed description thereof is omitted to avoid repetition. Then, the URL#Z may be compared with the URL#D or the URL#Z may be compared with the URL#E, to find a same part (which includes a same Path level and a same Path value, and/or, a same name and a same parameter value of a Query Param, and for ease of differentiation, is denoted as a same part B). Then the same part A is compared with the same part B, different parts (which include different Path levels and different Path values, and different names and different parameter values of Query Params) are removed, and remaining parts are used as a training basis for the identifier part extraction model, so that accuracy of the identifier part extraction model in the present disclosure can be further improved.

In this embodiment of the present disclosure, the gateway device may cache a video obtained from each video server (that is, an example of the cached video), and may extract, according to the foregoing obtained identifier part extraction model, an identifier of each video from a URL corresponding to each video (that is, an example of the caching URL), as an index corresponding to the video.

Optionally, the method further includes:

receiving at least one verification URL, where a non-Host sub character string of the at least one verification URL includes a character string of the identifier part of each of the caching URLs;

forwarding the at least one verification URL to the video server;

receiving a verification video that is sent by the video server according to the at least one verification URL; and determining that the verification video is the same as the cached video.

Specifically, in this embodiment of the present disclosure, to verify accuracy of the identifier part extraction model, online verification may be performed. For example, after a URL#X sent by a piece of user equipment X is received, an identifier part of the URL#X may be extracted according to the identifier part extraction model and used as an index, and a video X1 corresponding to the URL#X may be determined from the cached video. In addition, the URL#X may be forwarded to the video server, and a video X2 corresponding to the video may be obtained from the video server. If the video X1 is the same as the video X2, it may be considered that the identifier part extraction model is accurate. If the video X1 is different from the video X2, it may be considered that the identifier part extraction model is inaccurate, and a sample URL may be reselected, to obtain a new identifier part extraction model through training.

The process of determining the video C corresponding to the URL#C is executed again, that is, after receiving the URL#C, the gateway device may acquire an identifier of the video C by using the identifier part extraction model, as an index, and find the video C from the cached video.

Optionally, before the traversing a non-Host part of the target URL, the method further includes:

determining that the Host part of the target URL is the same as a Host part of at least one URL of the caching URLs.

In addition, optionally, Host parts of the caching URLs are the same.

Specifically, a same video website generally uses a same rule when generating a URL. For example, in different URLs generated when different pieces of user equipment request to watch a same video, levels or names of Query Params that are used to identify a Path part of the video generally are the same. Therefore, after it is determined that a Host part of the URL#C is the same as a Host part of the caching URL, it can be determined that the video website corresponding to the URL#C is the same as the video website of the caching URL, so that a character in the URL#C that is used to identify the video C can be reliably determined by using the identifier part extraction model, and accuracy of the acquired video is further improved.

Optionally, the non-Host part includes a Path part, and depths of Path parts of the caching URLs are the same; and before the traversing a non-Host part of the target URL, the method further includes:

determining that a depth of a Path part of the target URL is the same as the depth of the Path part of each of the caching URLs.

Specifically, a same video website generally uses a same rule when generating a URL. For example, in different URLs generated when different pieces of user equipment request to watch a same video, Path parts used to identify the video have a same depth. Therefore, if it is determined that a depth of the Path part of the URL#C is different from a depth of a Path part of the caching URL, it may be determined that the video corresponding to the URL#C is not cached, and therefore, a searching action is not required, thereby improving efficiency of the video transmission method in this embodiment of the present disclosure, and enhancing user experience.

Optionally, the non-Host part includes a Path part and a Query Param part;

the method further includes:

acquiring a parameter name of a query parameter that is included in a Query Param part of each of the caching URLs, to generate a parameter name set; and before the traversing a non-Host part of the target URL, the method further includes:

determining that a parameter name of a query parameter that is included in a Query Param part of the target URL belongs to the parameter name set.

Specifically, the gateway device may determine a parameter name of a Query Param in each URL used to obtain the identifier part extraction model through training, and generate a parameter name set including all the parameter names, and if none of parameter names of all Query Params included in the URL#C belongs to the parameter name set, determine that an identifier used to indicate the video C cannot be extracted from the URL#C according to the identifier part extraction model; therefore, a subsequent action is not required, thereby improving efficiency of the video transmission method in this embodiment of the present disclosure, and enhancing user experience.

It should be understood that, a method for determining the video C corresponding to the URL#C in the foregoing example is only an exemplary description, and the present disclosure is not limited thereto. For example, the complete URL#C may be used as a caching index of the video C, or the URL#C may be directly forwarded to the video server, to obtain the video C from the video server.

After the video C corresponding to the URL#C is determined, a Rang part of the URL#C may be determined according to the foregoing obtained Rang part extraction model, and a location, in the video C, of a video segmentation corresponding to the Rang part, for example, a start time or an end time, may be further determined, and further, the video segmentation corresponding to the Rang part of the URL#C (that is, an example of the target video segmentation) may be captured from the video C.

Therefore, the gateway device may send the video segmentation to the user equipment C.

According to the video transmission method in this embodiment of the present disclosure, sample URLs that are from a same user and that correspond to a same video are acquired, and comparing the sample URLs, so that a segmentation part extraction model in a URL, which is used to identify a location of a video segmentation in a complete video, can be acquired, so that when a target URL of a piece of user equipment that carries a segmentation part is received, a second video corresponding to the target URL can be determined from a caching device, a target video segmentation can be determined from the second video according to the segmentation part of the target URL, and the target video segmentation is sent to the user equipment. Therefore, even if a user performs a dragging action, multiple clips do not need to be acquired from a video server, and multiple clips of a same video do not need to be cached in the caching device either, so that the same video is prevented from being cached for multiple times, and further, the target video segmentation is transmitted to the user equipment relatively quickly, caching efficiency of the caching device can be improved, and a processing burden of the caching device can be reduced.

With reference to FIG. 2 to FIG. 4, the foregoing describes in detail the video transmission method according to this embodiment of the present disclosure, and with reference to FIG. 5, the following describes in detail a gateway device configured to implement the foregoing method according to an embodiment of the present disclosure. As described above, one side of the gateway device is communicatively connected to one or more video servers, and the other side of the gateway device is also communicatively connected to one or more pieces of user equipment; the gateway device is communicatively connected to a caching device, or, a caching device is integrated in the gateway device; the one or more pieces of user equipment include a second user equipment; and the one or more video servers include a target video server.

FIG. 5 shows a schematic block diagram of a gateway device 200 according to an embodiment of the present disclosure, and as shown in FIG. 5, the gateway device 200 includes:

a receiving unit 220, configured to receive a target URL sent by the second user equipment;

a determining unit 210, configured to determine, from the caching device, a second video corresponding to the target URL, determine a segmentation part of the target URL according to a segmentation part extraction model, and determine a target video segmentation from the second video according to the segmentation part of the target URL, where the second video is from the target video server, the segmentation part extraction model is used to indicate a segmentation part of a uniform resource locator URL, and the segmentation part is used to indicate a range of a video segmentation in an original video; and a sending unit 230, configured to send the target video segmentation to the second user equipment.

Optionally, the receiving unit 220 is further configured to receive a first sample URL and a second sample URL that are from a first user equipment, where the first sample URL and the second sample URL both correspond to a first video; and the determining unit 210 is further configured to determine a first sample information set according to the first sample URL, determine a second sample information set according to the second sample URL, compare the first sample information set with the second sample information set according to the segmentation part extraction condition, to determine segmentation information meeting the segmentation part extraction condition, and determine the segmentation part extraction model according to the segmentation information.

Optionally, the first sample URL includes a Path part and a Query Param part; the Query Param part of the first sample URL includes K Query Params; the first sample information set includes at least one of the following: first information and second information; the first information is used to indicate a depth and a Path value of the Path part of the first sample URL; there are K pieces of second information; the K pieces of second information correspond one-to-one to the K Query Params in the first sample URL; each piece of second information is used to indicate a name and a parameter value of a corresponding Query Param; the second sample URL includes a Path part and a Query Param part; the Query Param part of the second sample URL includes M Query Params; the second sample information set includes at least one of the following: third information and fourth information; the third information is used to indicate a depth and a Path value of the Path part of the second sample URL; there are M pieces of fourth information; the M pieces of fourth information correspond one-to-one to the M Query Params in the second sample URL; and each piece of the fourth information is used to indicate a name and a parameter value of a corresponding Query Param.

Optionally, the segmentation part extraction condition includes at least one of the following: a first condition, a second condition, and a third condition, where the first condition is: a depth of a Path part indicated by the segmentation information is the same in the first sample information set and the second sample information set, and a Path value indicated by the segmentation information is different in the first sample information set and the second sample information set;

the second condition is: a name of a Query Param indicated by the segmentation information belongs to both the first sample information set and the second sample information set, and a parameter value of a Query Param indicated by the segmentation information is different in the first sample information set and the second sample information set; and the third condition is: a name of a Query Param indicated by the segmentation information belongs to only one of the following: the first sample information set and the second sample information set.

Optionally, in an aspect of receiving the first sample URL and the second sample URL that are from the first user equipment, the receiving unit 210 is specifically configured to receive the first sample URL in a first period of time, and receive the second sample URL in a second period of time, where an interval between the first period of time and the second period of time is determined according to a length of the first video.

Optionally, the first sample URL is a URL that is sent by the first user equipment when the first user equipment requests to acquire the first video.

Optionally, hostname Host parts of the first sample URL and the second sample URL have a same character string.

Optionally, the determining unit 210 is further configured to determine an identifier part extraction model used to indicate an identifier part of a URL, determine, according to the identifier part extraction model, an identifier part of each caching URL of a cached video in the caching device, traverse a non-Host part of the target URL, and if it is determined that the non-Host part of the target URL includes a character string of an identifier part of at least one of the caching URLs, determine that the cached video is the second video, where each of the caching URLs corresponds to the cached video.

Optionally, the identifier part extraction model is determined according to identifier parts of at least two third sample URLs, the third sample URLs all correspond to a third video, the third sample URLs have different character strings, identifier parts of the third sample URLs have a same character string, the third sample URLs correspond to different pieces of user equipment, each of the identifier parts is included in a non-Host part of each of the third sample URLs, and the non-Host part is a part in a character string of the URL except a Host part.

Optionally, in an aspect of traversing the non-Host part of the target URL, the determining unit 210 is specifically configured to: when a Host part of the target URL is the same as a Host part of at least one URL of the caching URLs, traverse the non-Host part of the target URL.

Optionally, the non-Host part includes a Path part, and depths of Path parts of the caching URLs are the same; and in an aspect of traversing the non-Host part of the target URL, the determining unit 210 is specifically configured to: when a depth of a Path part of the target URL is the same as the depth of the Path part of each of the caching URLs, traverse the non-Host part of the target URL.

Optionally, the non-Host part includes a Path part; and in an aspect of traversing the non-Host part of the target URL, the determining unit 210 is specifically configured to: when a Path part of the target URL is the same as a Path part of at least one URL of the caching URLs, traverse the non-Host part of the target URL.

Optionally, the non-Host part includes a Path part and a Query Param part; and in an aspect of traversing the non-Host part of the target URL, the determining unit 210 is specifically configured to acquire a parameter name of a query parameter that is included in a Query Param part of each of the caching URLs, to generate a parameter name set; and when a parameter name of a query parameter that is included in a Query Param part of the target URL belongs to the parameter name set, traverse the non-Host part of the target URL.

Optionally, the receiving unit 210 is further configured to receive at least one verification URL, where a non-Host sub character string of the at least one verification URL includes a character string of the identifier part of each of the caching URLs;

the sending unit 230 is further configured to forward the at least one verification URL to the video server;

the receiving unit 220 is further configured to receive a verification video that is sent by the video server according to the at least one verification URL; and the determining unit 230 is further configured to determine that the verification video is the same as the cached video.

Optionally, the cached video belongs to the third video.

Optionally, the receiving unit 210 is further configured to determine that a character string of the Host part of the target URL is the same as a character string of a Host part of the first sample URL; or the receiving unit 210 is configured to determine that a character string of the Host part of the target URL is the same as a character string of a Host part of the second sample URL.

The gateway device 200 according to this embodiment of the present disclosure may correspond to the gateway device in the method according to the embodiment of the present disclosure, and each unit, that is, module, of the gateway device 200 and the other operations and/or functions are used to implement corresponding procedures in the method 100 in FIG. 2. For brevity, details are not described herein again.

According to the gateway device in this embodiment of the present disclosure, sample URLs that are from a same user and that correspond to a same video are acquired, and compare the sample URLs, so that a segmentation part extraction model in a URL. which is used to identify a location of a video segmentation in a complete video, can be acquired, so that when a target URL of a piece of user equipment that carries a segmentation part is received, a second video corresponding to the target URL can be determined from a caching device, a target video segmentation can be determined from the second video according to the segmentation part of the target URL, and the target video segmentation is sent to the user equipment. Therefore, even if a user performs a dragging action, multiple clips do not need to be acquired from a video server, and multiple clips of a same video do not need to be cached in the caching device either, so that the same video is prevented from being cached for multiple times, and further, the target video segmentation is transmitted to the user equipment relatively quickly, caching efficiency of the caching device can be improved, and a processing burden of the caching device can be reduced.

Figure 6:
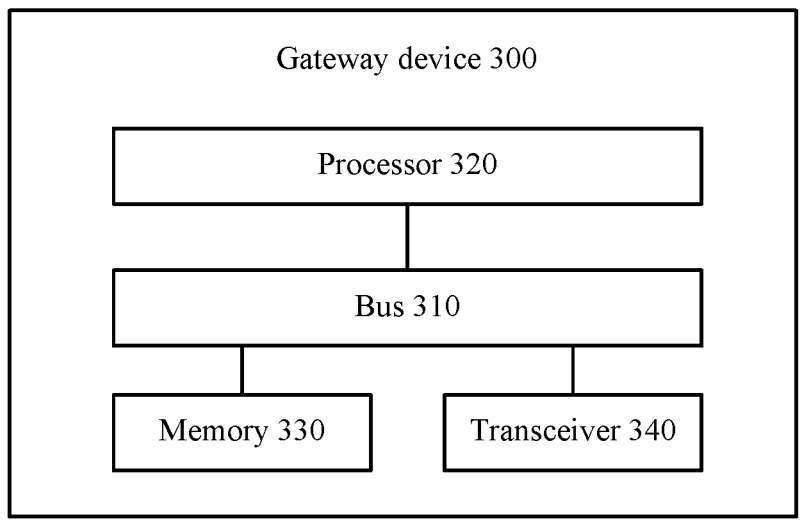
FIG. 6 is a schematic structural diagram of a gateway device according to an embodiment of the present disclosure.

With reference to FIG. 2 to FIG. 4, the foregoing describes in detail the video transmission method in the embodiment of the present disclosure, and with reference to FIG. 6, the following describes in detail a gateway device in an embodiment of the present disclosure. One side of the gateway device is communicatively connected to one or more video servers, and the other side of the gateway device is also communicatively connected to one or more pieces of user equipment; the gateway device is communicatively connected to a caching device, or, a caching device is integrated in the gateway device; the one or more pieces of user equipment include a second user equipment; the one or more video servers include a target video server; and the gateway device is configured to implement the video transmission method in the embodiment of the present disclosure. For related implementation details, refer to the foregoing method embodiment.

FIG. 6 shows a gateway device 300 in an embodiment of the present disclosure, and as shown in FIG. 6, the device 300 includes:

a bus 310;

a processor 320 connected to the bus 310;

a memory 330 connected to the bus 310; and a transceiver 340 connected to the bus 310.

The processor 320 invokes, by using the bus 310, a program stored in the memory 330, to:

control the transceiver 340 to receive a target URL sent by a second user equipment, and determine, from a caching device, a second video corresponding to the target URL, where the second user equipment is one of at least one user equipment included in a video transmission system, the second video is from a target video server; for example, the second video is acquired by the gateway device 300 from the video server and cached in the caching device before the second user equipment sends the target URL;

determine a segmentation part of the target URL according to the segmentation part extraction model; and determine a target video segmentation from the second video according to the segmentation part of the target URL, and send the target video segmentation to the second user equipment.

Optionally, the segmentation part extraction model is determined according to segmentation information; the segmentation information is determined from a first sample information set and a second sample information set by comparing, based on a segmentation part extraction condition, the first sample information set with the second sample information set; the first sample information set is determined according to a first sample URL that is from a first user equipment; the first sample URL includes a Path part and a Query Param part; the Query Param part of the first sample URL includes K Query Params; the first sample URL corresponds to a first video; the first sample information set includes at least one of the following: first information and second information; the first information is used to indicate a depth and a Path value of the Path part of the first sample URL; the second information is used to indicate names and parameter values of the K Query Params in the first sample URL; the second sample information set is determined according to a second sample URL that is from the first user equipment; the second sample URL includes a Path part and a Query Param part; the Query Param part of the second sample URL includes M Query Params; the second sample URL corresponds to the first video; the second sample information set includes at least one of the following: third information and fourth information; the third information is used to indicate a depth and a Path value of the Path part of the second sample URL; and the fourth information is used to indicate names and parameter values of the M Query Params in the second sample URL. The segmentation part extraction condition includes at least one of the following: a first condition, a second condition, and a third condition, where the first condition is: a depth of a Path part indicated by the segmentation information is the same in the first sample information set and the second sample information set, and a Path value indicated by the segmentation information is different in the first sample information set and the second sample information set;

the second condition is: a name of a Query Param indicated by the segmentation information belongs to both the first sample information set and the second sample information set, and a parameter value of a Query Param indicated by the segmentation information is different in the first sample information set and the second sample information set; and the third condition is: a name of a Query Param indicated by the segmentation information belongs to only one of the following: the first sample information set and the second sample information set.

Optionally, the processor 320 is further configured to control the transceiver 340 to receive the first sample URL and the second sample URL;

determine the first sample information set according to the first sample URL, and determine the second sample information set according to the second sample URL;

compare the first sample information set with the second sample information set according to the segmentation part extraction condition, to determine the segmentation information; and determine the segmentation part extraction model according to the segmentation information.

Optionally, the processor 320 is specifically configured to control the transceiver 340 to receive the first sample URL in a first period of time, and receive the second sample URL in a second period of time, where an interval between the first period of time and the second period of time is determined according to a length of the first video.

Optionally, the first sample URL is a URL that is sent by the first user equipment when the first user equipment requests to acquire the first video.

Optionally, hostname Host parts of the first sample URL and the second sample URL have a same character string.

Optionally, the processor 320 specifically controls the transceiver 340 to receive a cached video and at least one caching URL, where the at least one caching URL corresponds to the cached video;

determine an identifier part of the at least one caching URL according to an identifier part extraction model, where the identifier part extraction model is determined according to identifier parts of at least two third sample URLs, the third sample URLs all correspond to a third video, the third sample URLs have different character strings, identifier parts of the third sample URLs have a same character string, the third sample URLs correspond to different pieces of user equipment, each of the identifier parts is included in a non-Host part of each of the third sample URLs, and the non-Host part is a part in a character string of the URL except a Host part; and traverse a non-Host part of the target URL, and if it is determined that the non-Host part of the target URL includes a character string of an identifier part of at least one of the caching URLs, determine that the cached video is the second video.

Optionally, the processor 320 is specifically configured to determine that the Host part of the target URL is the same as a Host part of at least one URL of the caching URLs.

Optionally, Host parts of the caching URLs are the same.

Optionally, the non-Host part includes a Path part, and depths of Path parts of the caching URLs are the same; and the processor 320 is specifically configured to determine that a depth of a Path part of the target URL is the same as the depth of the Path part of each of the caching URLs.

Optionally, the non-Host part includes a Path part; and the processor 320 is specifically configured to determine that a Path part of the target URL is the same as a Path part of at least one URL of the caching URLs.

Optionally, the non-Host part includes a Path part and a Query Param part; and the processor 320 is specifically configured to acquire a parameter name of a query parameter that is included in a Query Param part of each of the caching URLs, to generate a parameter name set; and determine that a parameter name of a query parameter that is included in a Query Param part of the target URL belongs to the parameter name set.

Optionally, the processor 320 is specifically configured to control the transceiver 340 to receive at least one verification URL, where a non-Host sub character string of the at least one verification URL includes a character string of the identifier part of each of the caching URLs;

control the transceiver 340 to forward the at least one verification URL to the video server;

control the transceiver 340 to receive a verification video that is sent by the video server according to the at least one verification URL; and determine that the verification video is the same as the cached video.

Optionally, the cached video belongs to the third video.

Optionally, the processor 320 is specifically configured to determine that a character string of the Host part of the target URL is the same as a character string of a Host part of the first sample URL; or determine that a character string of the Host part of the target URL is the same as a character string of a Host part of the second sample URL.

In this embodiment of the present disclosure, the processor may be further referred to as a CPU. The memory may include a read-only memory and a random access memory, and provides an instruction and a signal to the processor. A part of the memory may further include a non-volatile random access memory (NVRAM). In a specific application, a signal transmission device may be embedded into or may be, for example, a standard Ethernet communications device such as a personal computer, and modules of the signal transmission device are coupled together by using a bus system. In addition to a signal bus, the bus system further includes a power bus, a control bus, and a status signal bus.

The processor may implement or performs steps and logical block diagrams disclosed in the method embodiments of the present disclosure. A general purpose processor may be a microprocessor or the processor may be any conventional processor, decoder, and the like. Steps of the methods disclosed with reference to the embodiments of the present disclosure may be directly executed and completed by means of a hardware processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and a decoding unit or a processing unit reads information in the memory and completes the steps in the foregoing methods in combination with hardware of the decoding unit or the processing unit.

It should be understood that in the embodiments of the present disclosure, the processor may be a central processing unit (CPU), or the processor may be another general purpose processor, a digital signal processor (DSP), an application-specific integrated circuit (ASIC), a field programmable gate array (FPGA), or another programmable logical device, discrete gate or transistor logical device, discrete hardware component, or the like. A general purpose processor may be a microprocessor or the processor may be any conventional processor and the like.

Steps of the methods disclosed with reference to the embodiments of the present disclosure may be directly executed and completed by means of a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor. To avoid repetition, details are not described herein again.

The gateway device 300 according to this embodiment of the present disclosure may correspond to the gateway device in the method according to the embodiment of the present disclosure, and each unit, that is, module, of the gateway device 300 and the other operations and/or functions are used to implement corresponding procedures in the method 100 in FIG. 2. For brevity, details are not described herein again.

According to the gateway device in this embodiment of the present disclosure, sample URLs that are from a same user and that correspond to a same video are acquired, and compare the sample URLs, so that a segmentation part extraction model in a URL, which is used to identify a location of a video segmentation in a complete video, can be acquired, so that when a target URL of a piece of user equipment that carries a segmentation part is received, a second video corresponding to the target URL can be determined from a caching device, a target video segmentation can be determined from the second video according to the segmentation part of the target URL, and the target video segmentation is sent to the user equipment. Therefore, even if a user performs a dragging action, multiple clips do not need to be acquired from a video server, and multiple clips of a same video do not need to be cached in the caching device either, so that the same video is prevented from being cached for multiple times, and further, the target video segmentation is transmitted to the user equipment relatively quickly, caching efficiency of the caching device can be improved, and a processing burden of the caching device can be reduced.

Figure 7:
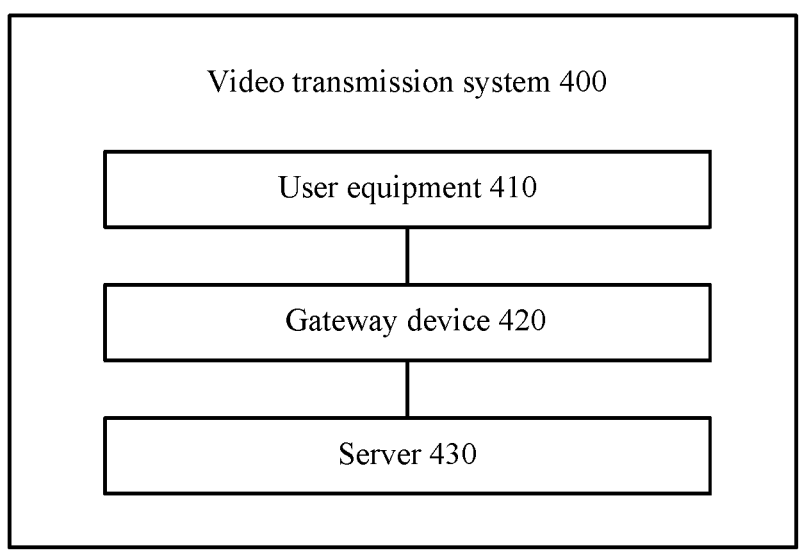
FIG. 7 is a schematic architectural diagram of a video transmission system according to an embodiment of the present disclosure.

With reference to FIG. 2 to FIG. 4, the foregoing describes in detail the video transmission method in the embodiment of the present disclosure, and with reference to FIG. 7, the following describes in detail a video transmission system in an embodiment of the present disclosure.

FIG. 7 shows a video transmission system 400 in an embodiment of the present disclosure, and as shown in FIG. 7, the system 600 includes:

a piece of user equipment 410, configured to send a uniform resource locator URL to a gateway device, and acquire, from the gateway device, a video corresponding to the URL;

a gateway device 420, configured to determine a segmentation part extraction model, where the segmentation part extraction model is used to indicate a segmentation part of a uniform resource locator URL; receive a target URL sent by a second user equipment, and determine, from a caching device, a second video corresponding to the target URL; determine a segmentation part of the target URL according to the segmentation part extraction model; and determine a target video segmentation from the second video according to the segmentation part of the target URL, and send the target video segmentation to the second user equipment; and a video server 430, configured to receive the URL forwarded by the gateway device, determine the video corresponding to the URL, and send the video to the gateway device.

Optionally, the segmentation part extraction model is determined according to segmentation information; the segmentation information is determined from a first sample information set and a second sample information set by comparing, based on a segmentation part extraction condition, the first sample information set with the second sample information set; the first sample information set is determined according to a first sample URL that is from a first user equipment; the first sample URL includes a Path part and a Query Param part; the Query Param part of the first sample URL includes K Query Params; the first sample URL corresponds to a first video; the first sample information set includes at least one of the following: first information and second information; the first information is used to indicate a depth and a Path value of the Path part of the first sample URL; the second information is used to indicate names and parameter values of the K Query Params in the first sample URL; the second sample information set is determined according to a second sample URL that is from the first user equipment; the second sample URL includes a Path part and a Query Param part; the Query Param part of the second sample URL includes M Query Params; the second sample URL corresponds to the first video; the second sample information set includes at least one of the following: third information and fourth information; the third information is used to indicate a depth and a Path value of the Path part of the second sample URL; and the fourth information is used to indicate names and parameter values of the M Query Params in the second sample URL. The segmentation part extraction condition includes at least one of the following: a first condition, a second condition, and a third condition, where the first condition is: a depth of a Path part indicated by the segmentation information is the same in the first sample information set and the second sample information set, and a Path value indicated by the segmentation information is different in the first sample information set and the second sample information set;

the second condition is: a name of a Query Param indicated by the segmentation information belongs to both the first sample information set and the second sample information set, and a parameter value of a Query Param indicated by the segmentation information is different in the first sample information set and the second sample information set; and the third condition is: a name of a Query Param indicated by the segmentation information belongs to only one of the following: the first sample information set and the second sample information set.

The gateway device 420 in the video transmission system 400 according to this embodiment of the present disclosure may correspond to the gateway device in the method according to the embodiment of the present disclosure, and each unit, that is, module, of the gateway device 420 and the other operations and/or functions are used to implement corresponding procedures in the method 100 in FIG. 2. For brevity, details are not described herein again.

According to the video transmission system in this embodiment of the present disclosure, sample URLs that are from a same user and that correspond to a same video are acquired, and compare the sample URLs, so that a segmentation part extraction model in a URL, which is used to identify a location of a video segmentation in a complete video, can be acquired, so that when a target URL of a piece of user equipment that carries a segmentation part is received, a second video corresponding to the target URL can be determined from a caching device, a target video segmentation can be determined from the second video according to the segmentation part of the target URL, and the target video segmentation is sent to the user equipment. Therefore, even if a user performs a dragging action, multiple clips do not need to be acquired from a video server, and multiple clips of a same video do not need to be cached in the caching device either, so that the same video is prevented from being cached for multiple times, and further, the target video segmentation is transmitted to the user equipment relatively quickly, caching efficiency of the caching device can be improved, and a processing burden of the caching device can be reduced.

It should be understood that sequence numbers of the foregoing processes do not mean execution sequences in various embodiments of the present disclosure. The execution sequences of the processes should be determined according to functions and internal logic of the processes, and shall not be construed as any limitation to the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it shall not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communicative connections may be implemented by using some interfaces. The indirect couplings or communicative connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A video transmission method, comprising:
  receiving, by a gateway device, a target uniform resource locator (URL), wherein the gateway device is communicatively connected to one or more video servers and one or more user equipments; wherein the one or more user equipments comprise a second user equipment and the one or more video servers comprise a target video server; wherein the gateway device is further communicatively connected to a caching device, or, a caching device is integrated in the gateway device; and wherein the target URL is received from the second user equipment;
  determining, by the gateway device, from the caching device, a second video corresponding to the target URL, wherein the second video is from the target video server;
  receiving, by the gateway device, a first sample URL and a second sample URL that are received from a first user equipment, wherein the first sample URL and the second sample URL both correspond to a first video;
  determining, by the gateway device, a first sample information set according to the first sample URL, and determining a second sample information set according to the second sample URL;
  comparing, by the gateway device, the first sample information set with the second sample information set according to a segmentation part extraction condition, to determine segmentation information meeting the segmentation part extraction condition, wherein the segmentation part extraction condition comprises at least one of the following: a first condition, a second condition, and a third condition,
    wherein the first condition is: a depth of a path part indicated by the segmentation information is the same in the first sample information set and the second sample information set, and a path value indicated by the segmentation information is different in the first sample information set and the second sample information set,
    wherein the second condition is: a name of a query parameter indicated by the segmentation information belongs to both the first sample information set and the second sample information set, and a parameter value of a query parameter indicated by the segmentation information is different in the first sample information set and the second sample information set, and
    wherein the third condition is: a name of a query parameter indicated by the segmentation information belongs to only one of the following: the first sample information set and the second sample information set; and
  determining, by the gateway device, a segmentation part extraction model according to the segmentation information;
  determining, by the gateway device, a segmentation part of the target URL according to the segmentation part extraction model, wherein the segmentation part extraction model is used to indicate a segmentation part of a URL, and the segmentation part is used to identify a location of a video segmentation in a video; and
  determining, by the gateway device, a target video segmentation from the second video according to the segmentation part of the target URL, and sending the target video segmentation to the second user equipment.

2. The method according to claim 1, wherein:
the first sample URL comprises a path part and a query parameter part, wherein the query parameter part of the first sample URL comprises K query parameters;
the first sample information set comprises at least one of the following: first information and second information, wherein the first information is used to indicate a depth and a path value of the path part of the first sample URL, and the second information is used to indicate names and parameter values of the K query parameters in the first sample URL;
the second sample URL comprises a path part and a query parameter part, wherein the query parameter part of the second sample URL comprises M query parameters; and
the second sample information set comprises at least one of the following: third information and fourth information, wherein the third information is used to indicate a depth and a path value of the path part of the second sample URL, and the fourth information is used to indicate names and parameter values of the M query parameters in the second sample URL.

3. The method according to claim 1, wherein the receiving, by the gateway device, the first sample URL and the second sample URL that are received from a first user equipment comprises:
  receiving, by the gateway device, the first sample URL in a first period of time, and receiving the second sample URL in a second period of time.

4. The method according to claim 1, wherein the determining, from the caching device, the second video corresponding to the target URL comprises:
  determining an identifier part extraction model, wherein the identifier part extraction model is used to indicate a identifier part of a URL;
  determining, according to the identifier part extraction model, an identifier part of each caching URL of a cached video in the caching device, wherein each caching URL corresponds to the cached video; and
  traversing a non-Host part of the target URL, and if it is determined that the non-Host part of the target URL comprises a character string of an identifier part of at least one of the caching URLs, determining that the cached video is the second video.

5. The method according to claim 4, wherein the identifier part extraction model is determined according to identifier parts of at least two third sample URLs, wherein each of the third sample URLs corresponds to a third video, the third sample URLs have different character strings, identifier parts of the third sample URLs have a same character string, the third sample URLs correspond to different user equipments, each of the identifier parts is comprised in a non-Host part of each of the third sample URLs, and the non-Host part is a part in a character string of the URL except a Host part.

6. The method according to claim 4, wherein the traversing the non-Host part of the target URL comprises:
  when a Host part of the target URL is the same as a Host part of at least one URL of the caching URLs, traversing the non-Host part of the target URL.

7. The method according to claim 4, wherein the non-Host part comprises a path part, and depths of path parts of the caching URLs are the same; and
  the traversing a non-Host part of the target URL comprises:
    when a depth of a path part of the target URL is the same as the depth of the path part of each of the caching URLs, traversing the non-Host part of the target URL.

8. The method according to claim 4, wherein the non-Host part comprises a path part; and
  the traversing a non-Host part of the target URL comprises:
    when a path part of the target URL is the same as a path part of at least one URL of the caching URLs, traversing the non-Host part of the target URL.

9. A gateway device, comprising:
  a transceiver, configured to:
    receive a target uniform resource locator (URL), wherein the gateway device is communicatively connected to one or more video servers and one or more user equipments; wherein the gateway device is further communicatively connected to a caching device, or, a caching device is integrated in the gateway device; wherein the one or more user equipments comprise a second user equipment; and the one or more video servers comprise a target video server; and wherein the target URL is received from a second user equipment; and
    receive a first sample URL and a second sample URL that are received from a first user equipment, wherein the first sample URL and the second sample URL both correspond to a first video;
  a processor, configured to:
    determine, from the caching device, a second video corresponding to the target URL,
    determine a first sample information set according to the first sample URL, and determining a second sample information set according to the second sample URL;
    compare the first sample information set with the second sample information set according to a segmentation part extraction condition, to determine segmentation information meeting the segmentation part extraction condition, wherein the segmentation part extraction condition comprises at least one of the following: a first condition, a second condition, and a third condition,
      wherein the first condition is: a depth of a path part indicated by the segmentation information is the same in the first sample information set and the second sample information set, and a path value indicated by the segmentation information is different in the first sample information set and the second sample information set,
      wherein the second condition is: a name of a query parameter indicated by the segmentation information belongs to both the first sample information set and the second sample information set, and a parameter value of a query parameter indicated by the segmentation information is different in the first sample information set and the second sample information set, and
      wherein the third condition is: a name of a query parameter indicated by the segmentation information belongs to only one of the following: the first sample information set and the second sample information set;
    determine a segmentation part extraction model according to the segmentation information;
    determine a segmentation part of the target URL according to the segmentation part extraction model, and
    determine a target video segmentation from the second video according to the segmentation part of the target URL, wherein the second video is from the target video server, the segmentation part extraction model is used to indicate a segmentation part of a URL, and the segmentation part is used to identify a location of a video segmentation in a video;
  wherein the transceiver is further configured to send the target video segmentation to the second user equipment.

10. The gateway device according to claim 9, wherein:
the first sample URL comprises a path part and a query parameter part, wherein the query parameter part of the first sample URL comprises K query parameters;
the first sample information set comprises at least one of the following: first information and second information, wherein the first information is used to indicate a depth and a path value of the path part of the first sample URL, and the second information is used to indicate names and parameter values of the K query parameters in the first sample URL;

the second sample URL comprises a path part and a query parameter part, wherein the query parameter part of the second sample URL comprises M query parameters; and the second sample information set comprises at least one of the following: third information and fourth information, wherein the third information is used to indicate a depth and a path value of the path part of the second sample URL, and the fourth information is used to indicate names and parameter values of the M query parameters in the second sample URL.

11. The gateway device according to claim 9, wherein the transceiver is configured to receive the first sample URL in a first period of time, and receive the second sample URL in a second period of time.

12. The gateway device according to claim 9, wherein the processor is further configured to determine an identifier part extraction model used to indicate an identifier part of a URL, determine, according to the identifier part extraction model, an identifier part of each caching URL of a cached video in the caching device, traverse a non-Host part of the target URL, and if it is determined that the non-Host part of the target URL comprises a character string of an identifier part of at least one of the caching URLs, determine that the cached video is the second video, wherein each of the caching URLs corresponds to the cached video.

13. The gateway device according to claim 12, wherein the identifier part extraction model is determined according to identifier parts of at least two third sample URLs, wherein each of the third sample URLs corresponds to a third video, the third sample URLs have different character strings, identifier parts of the third sample URLs have a same character string, the third sample URLs correspond to different user equipments, each of the identifier parts is comprised in a non-Host part of each of the third sample URLs, and the non-Host part is a part in a character string of the URL except a Host part.

14. The gateway device according to claim 12, wherein the processor is configured to: when a Host part of the target URL is the same as a Host part of at least one URL of the caching URLs, traverse the non-Host part of the target URL.

15. The gateway device according to claim 12, wherein the non-Host part comprises a path part, and depths of path parts of the caching URLs are the same; and the processor is configured to: when a depth of a path part of the target URL is the same as the depth of the path part of each of the caching URLs, traverse the non-Host part of the target URL.

16. A video transmission system, comprising:

a gateway device according to claim 9;

a user equipment, configured to send the target URL to the gateway device, and acquire, from the gateway device, the video corresponding to the target URL; and a video server, configured to receive the target URL forwarded by the gateway device, determine the video corresponding to the target URL, and send the video to the gateway device.

* * * * *